US012687178B2

(12) United States Patent
Billich et al.

(10) Patent No.: US 12,687,178 B2
(45) Date of Patent: Jul. 21, 2026

(54) HYDRAULIC ASSEMBLY AND COMMERCIAL VEHICLE

(71) Applicant: DEERE & COMPANY, Moline, IL (US)

(72) Inventors: Manuel Billich, Dornstadt (DE); Michael Meid, Waghaeusel (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/828,228

(22) Filed: Sep. 9, 2024

(65) Prior Publication Data

US 2025/0137469 A1 May 1, 2025

(30) Foreign Application Priority Data

Oct. 27, 2023 (DE) ......................... 102023129650.7

(51) Int. Cl.
*F15B 11/16* (2006.01)
*F15B 7/00* (2006.01)

(52) U.S. Cl.
CPC ............ *F15B 7/006* (2013.01); *F15B 11/165* (2013.01); *F15B 2211/20546* (2013.01); *F15B 2211/327* (2013.01)

(58) Field of Classification Search
CPC ............................. F15B 11/161; F15B 11/165
See application file for complete search history.

(56) References Cited

U.S. PATENT DOCUMENTS 4,801,247 A 1/1989 Hashimoto et al.
5,186,000 A 2/1993 Hirata et al.
7,870,728 B2 1/2011 Keuper et al.
9,394,894 B2 * 7/2016 Fedde .................... A01B 59/00
10,563,377 B2 * 2/2020 Kishida ................. E02F 9/2235
11,378,102 B1 * 7/2022 Quinn ................... F15B 11/165
11,378,104 B1 * 7/2022 Quinn ..................... F15B 11/17
2006/0142107 A1 6/2006 Kobayashi et al.
2015/0033720 A1 2/2015 Mate et al.
2016/0230787 A1 8/2016 Wagner

FOREIGN PATENT DOCUMENTS

DE 102010006858 A1 8/2011
DE 102020206343 A1 11/2021

OTHER PUBLICATIONS

Extended European Search Report and Written Opinion issued in European Patent Application No. 24196124.2 dated Jan. 28, 2025, in 19 pages.
Extended European Search Report and Written Opinion issued in European Patent Application No. 24196178.8 dated Jan. 27, 2025, in 14 pages.

* cited by examiner

*Primary Examiner* — Thomas E Lazo
(74) *Attorney, Agent, or Firm* — Tucker Ellis LLP

(57) ABSTRACT

A hydraulic assembly for a commercial vehicle includes a supply connector which is hydraulically connected or connectable to a pump outlet of a hydraulic variable pump and a feedback connector. The hydraulic assembly includes an adjustment control, which depends on an outlet pressure of the variable pump and on a reported pressure of the feedback connector, for adjusting the variable pump. A hydraulic valve device is disposed in the flow path between the feedback connector and the adjustment control. The valve device includes a valve unit which is effective as a hydraulic connection or interruption in the flow path, depending on a shift position. Moreover, the disclosure relates to a commercial vehicle having such a hydraulic assembly.

15 Claims, 4 Drawing Sheets

HYDRAULIC ASSEMBLY AND COMMERCIAL VEHICLE

CROSS-REFERENCE TO RELATED APPLICATIONS

This application claims priority to German Patent Application No. 102023129650.7, filed Oct. 27, 2023, which is hereby incorporated by reference.

TECHNICAL FIELD

The present disclosure relates generally to a hydraulic assembly for a commercial vehicle, having a hydraulic variable pump for supplying hydraulic consumers of the commercial vehicle. The disclosure furthermore relates to a commercial vehicle having such a hydraulic assembly.

BACKGROUND

In tractors, it is known to use variable pumps for supplying vehicle-internal or external hydraulic consumers. The variable pump is driven via a gearbox by the drive motor of the commercial vehicle or tractor. During a start-up procedure of the drive motor, the adjustment control of the variable pump is in many cases set to a maximum delivery position, i.e., for delivering a maximum quantity of hydraulic fluid. This requires a correspondingly high drive output of the drive motor. A cold start-up of the commercial vehicle can cause an additional increase in the utilized output of the variable pump due to the increased viscosity of the hydraulic medium.

SUMMARY

The present disclosure is based on the object of proposing a hydraulic assembly and a commercial vehicle which reduce the output required for the variable pump when starting up the commercial vehicle.

This object is achieved by a hydraulic assembly having the features of one or more embodiments disclosed herein, and by a commercial vehicle having the features of one or more embodiments disclosed herein.

Further advantageous design embodiments of the hydraulic assembly according to the disclosure, and of the commercial vehicle according to the disclosure, are derived from the one or more embodiments disclosed herein.

Proposed according to one or more embodiments disclosed herein is a hydraulic assembly for a commercial vehicle, which contains a hydraulic variable pump, a supply connector as an interface for supplying hydraulic consumers being connected or connectable to the pump outlet of said hydraulic variable pump. This may be vehicle-internal consumers, and optionally also vehicle-external consumers (e.g., add-on equipment). Furthermore provided on the hydraulic assembly is a feedback connector as an interface for pressure feedback from consumers. The variable pump is adjustable in terms of its discharge flow, or its volumetric flow, by an adjustment control which depends on an outlet pressure of the variable pump, a reported pressure of the feedback connector, and optionally on one or a plurality of further physical variables. Moreover, the hydraulic assembly contains a hydraulic valve device in the flow path between the feedback connector and the adjustment control.

In variable pumps the discharge flow, or the volumetric flow, of the conveyed hydraulic medium (e.g., oil) can be adjusted not only by different rotating speeds of the drive but also at a constant rotating speed of the drive of the variable pump. Various parameters are conceivable as control variables, e.g., a current hydraulic pressure, in particular at the variable pump outlet and/or at a hydraulic feedback connector at which a hydraulic reported pressures, or reported load pressure, of hydraulic consumers is prevalent. The respective control variable(s) can influence a suitable adjustment control which adjusts (continuously adjusts, for example) the variable pump in terms of its discharge flow.

The adjustment control can be adjusted between a conveying position having a maximum discharge flow and a conveying position having a minimum discharge flow. A hydraulic adjustment cylinder is preferably used herein.

Contained in the valve device according to one or more embodiments disclosed herein is a valve unit, the activation of the latter allowing specific shift positions to be activated. As a result, it is possible to limit or reduce the outlet pressure and/or the discharge flow, or the volumetric flow, of the variable discharge pump during a start-up procedure, in particular to a minimum, in a technically efficient manner. Consequently, the power input of the variable pump is advantageously limited or reduced. In this way, suitably activating the valve device, or the valve unit contained therein, in the context of an envisaged start-up procedure of the commercial vehicle can reduce the output required by the drive motor for the variable pump. A lower output of the drive motor during the start-up procedure is required in this way. Consequently, the drive motor and the starter motor of the commercial vehicle can be relieved of load in a start-up phase and be supported with low energy losses. The variable pump and the drive motor as well as the starter motor of the commercial vehicle are in particular relieved of load during a cold start-up with a high viscosity of the hydraulic medium. The start-up procedure of the commercial vehicle can be carried out with a significantly lower requirement in terms of output, which also facilitates the technical sequence of a successful cold start-up. Supporting the variable pump with an auxiliary pump can be dispensed with by the valve device used. Accordingly, the hydraulic assembly can be constructed in a more cost-efficient manner and with a smaller installation space.

For facilitating the start-up procedure of a commercial vehicle as described above, the valve device according to one or more embodiments disclosed herein contains a valve unit which is hydraulically interposed in the flow path. The valve unit interposed in the flow path, in a first shift position or output or resting position, acts as a hydraulic connection in the flow path between the feedback connector and the adjustment control, and in a second shift position as a hydraulic interruption in this flow path. The valve device by way of the activatable different shift positions of the valve unit thereof achieves a technically simple and cost-effective solution for the desired output reduction during a start-up procedure of the commercial vehicle.

In the second shift position of the valve unit, for instance, no load can be sensed on the variable pump, or the adjustment control, so that the variable pump only generates a comparatively low standby pressure and consequently has only a low power input.

In the context of the hydraulic assembly, the aforementioned tank connector is effective as a hydraulic interface to which a hydraulic tank is connectable. The hydraulic tank serves as a storage vessel for hydraulic medium (e.g., oil) within the hydraulic circuit discussed. The hydraulic assembly can contain a plurality of tank connectors as hydraulic interfaces.

The pump outlet, or the variable pump outlet, can be a hydraulic outlet directly on the variable pump per se, or be embodied as a hydraulic outlet of a pump unit that contains the variable pump.

In an embodiment, the valve unit of the valve device disposed in the flow path between the feedback connector and the adjustment control has a single valve connector at least on the connection side that faces the adjustment control. This facilitates a technically simple and cost-effective design embodiment of the valve unit. For example, the valve unit is designed as a 2/2-way valve. In this design embodiment, the valve device in the second shift position of the valve unit can act as a simple interruption between the adjustment control and the feedback connector. During a start-up procedure of the commercial vehicle and with an activated second shift position, the outlet pressure of the variable pump then increases only to a standby pressure, due to the absence of a sensed load. The standby pressure can optionally influence the adjustment control in such a manner that a conveying position with a minimum discharge flow is set at the variable pump. As a result, at least the outlet pressure of the variable pump, and optionally also the discharge flow, can be limited during the start-up procedure, which reduces the power input of the variable pump.

In another advantageous design embodiment of the valve unit disposed in the flow path between the adjustment control and the feedback connector, said valve unit has two valve connectors on the connection side that faces away from the adjustment control, one of the valve connectors being permanently hydraulically connected to a tank connector. It is consequently also guaranteed in different hydraulic marginal conditions that in the second shift position of the valve unit only a very low tank pressure is prevalent at the corresponding adjustment control inlet. This facilitates the generation of a low outlet pressure at the variable pump during the start-up procedure. As a result, the drive output required for the variable pump during the start-up phase of the commercial vehicle can be kept very low.

The hydraulic assembly contains additionally a hydraulic valve device in the flow path between the pump outlet and the supply connector. The valve device herein contains a hydraulically interposed valve unit in the flow path and/or a hydraulically branching valve unit to a tank connector. The valve unit interposed in the flow path, in a first shift position or output or resting position, acts as a hydraulic connection in the flow path, and in a second shift position as a hydraulic interruption in the flow path. The valve unit which is connected to the flow path as a branch toward a tank connector acts in a resting position, or first shift position, as a hydraulic interruption to the tank connector, and in a second shift position as a hydraulic connection to the tank connector. The combination of the two valve devices in the hydraulic assembly facilitates the desired output reduction during a start-up procedure of the commercial vehicle.

In an embodiment, the pump outlet of the variable pump is hydraulically connectable or hydraulically connected to a tank connector if the valve unit disposed in the flow path between the pump outlet and the supply connector assumes its second shift position. For example, a valve connector is permanently hydraulically connected to a tank connector. The hydraulic connection to the tank connector enables a very low tank pressure at the pump outlet. As a result, the drive output required for the variable pump during the start-up phase of the commercial vehicle can be kept very low even when the outlet pressure is insufficient for influencing the adjustment control in the direction of a reduced discharge flow.

For example, the hydraulic connection to the tank connector depends on reaching or exceeding a predetermined nominal pressure as an outlet pressure at the pump outlet. A connection to the tank connector can limit the pressure increase of the variable pump and thus the power input of the latter in the start-up phase of the commercial vehicle. The nominal pressure herein can be chosen in such a manner that said nominal pressure corresponds to a sufficiently high outlet pressure of the variable pump, which by means of the adjustment control achieves the conveying position with the minimum discharge flow and thus a further reduction in the required pump output. This can be implemented, for example, by a pressure relief valve interposed between the aforementioned valve connector and the tank connector, the restoring spring of said pressure relief valve being sized or adjustable to the nominal pressure.

In an embodiment, the hydraulic valve unit disposed in the flow path between the pump outlet of the variable pump and the supply connector has a single valve connector at least on the connection side that faces the pump outlet. This facilitates a technically simple and cost-effective design embodiment of the valve unit. For example, the valve unit is designed as a 2/2-way valve. In this design embodiment, the valve device in the second shift position of the valve unit can act as a simple interruption between the variable pump and the supply connector. During a start-up procedure of the commercial vehicle and with an activated second shift position, the outlet pressure of the variable pump then increases only up to a standby pressure which automatically influences the adjustment control in such a manner that a conveying position with a minimum discharge flow is set at the variable pump. As a result, the outlet pressure of the variable pump as well as the discharge flow are limited during the start-up procedure, which reduces the power input of the variable pump.

In a further design embodiment of the valve unit disposed in the flow path between the pump outlet of the variable pump and the supply connector, said valve unit has two valve connectors on the connection side that faces away from the pump outlet. One of these two valve connectors herein is assigned to the supply connector, while the other valve connector can be assigned to a tank connector. In the second shift position of the valve unit, which is effective as an interruption of the flow path, the pump outlet can then be connected to the tank connector.

In a further embodiment, the valve device disposed in the flow path between the pump outlet and the supply connector contains a valve unit as a branch to a tank connector, whereby this valve unit is designed as a 2/2-way valve. In the second shift position of this valve unit, the pump outlet is automatically hydraulically connected to the tank connector. As already mentioned, the drive output required for the variable pump during the start-up phase of the commercial vehicle can then be kept very low due to the low tank pressure.

Proceeding from the pump outlet, the hydraulic flow in the direction of the tank connector, or of the tank vessel connected thereto, has a significantly lower resistance than in the direction of the consumers. To this extent, a hydraulic interruption between the pump outlet and the supply connector can be implemented with little technical complexity and in a cost-effective manner, even without a valve unit which is effective as an interruption between the pump outlet and the supply connector. For this purpose, the valve device preferably contains only the aforementioned 2/2-way valve which is effective as branch to the tank connector. The second shift position of the valve unit branching off from the flow path can be activated electronically by means of a suitable control unit, for example.

Alternatively, the second shift position of the valve unit branching off from the flow path can be activated depending on reaching or exceeding a predetermined nominal pressure at the pump outlet. This automatic activation can be implemented by a valve unit designed as a pressure relief valve.

The aforementioned nominal pressure may be variably adjustable at the branching valve unit. For this purpose, the preload of a restoring spring of the pressure relief valve is differently set, for example. In this way, the valve unit can achieve a very low drive output of the variable pump at a low setting of the nominal pressure (e.g., 5 to 10 bar) during a start-up procedure, on the one hand, and ensure a reliable hydraulic interruption of the branch at a high setting of the nominal pressure (e.g., 235 bar) during normal operation of the variable pump, on the other hand.

The disclosure furthermore relates to a commercial vehicle, for example, an agricultural or silvicultural towing vehicle (e.g., a tractor) or a construction machine, having a drive motor and a hydraulic assembly as disclosed in one or more embodiments.

The commercial vehicle according to the disclosure has the above-described advantages of the hydraulic assembly according to the disclosure. The hydraulic assembly enables an efficient technical operating mode of the variable pump before, during and after a start-up procedure of the drive motor of a commercial vehicle. Conventional adverse effects in the start-up phase of the drive motor can be avoided in particular during a cold start-up. The hydraulic assembly thus makes it possible that the variable pump, the drive motor, and the starter motor driving the latter can be operated with particularly low energy losses during a cold start-up with a high viscosity of the hydraulic medium. The start-up procedure of the commercial vehicle can be carried out with a significantly lower output requirement, which also facilitates the technical sequence of a successful start-up.

In one example, the drive motor is operatively connected to the variable pump by way of a suitable component of a gearbox structure of the commercial vehicle.

The desired reduction of the drive output required for the variable pump is achieved in a technically efficient manner in that at least one valve unit, for example, all of the valve units, of the valve device(s) used assumes its/assume their second shift position immediately before a start-up procedure and/or during a start-up procedure of the drive motor.

For activating the different shift positions of the valve units, the latter can be activated, or actuated, electronically by means of a suitable control unit. Alternatively, individual or all of the valve units can have a hydraulic control input for changing the shift position. The control pressure for the control input may be the outlet pressure of the variable pump.

Other features and aspects will become apparent by consideration of the detailed description, claims, and accompanying drawings.

BRIEF DESCRIPTION OF THE DRAWINGS

The disclosure will be explained in more detail hereunder by means of the appended drawings. Components which are identical or equivalent in terms of their function herein are provided with the same reference signs. In the figures.

Like reference numerals are used to indicate like elements throughout the several figures.

DETAILED DESCRIPTION

Figure 1:
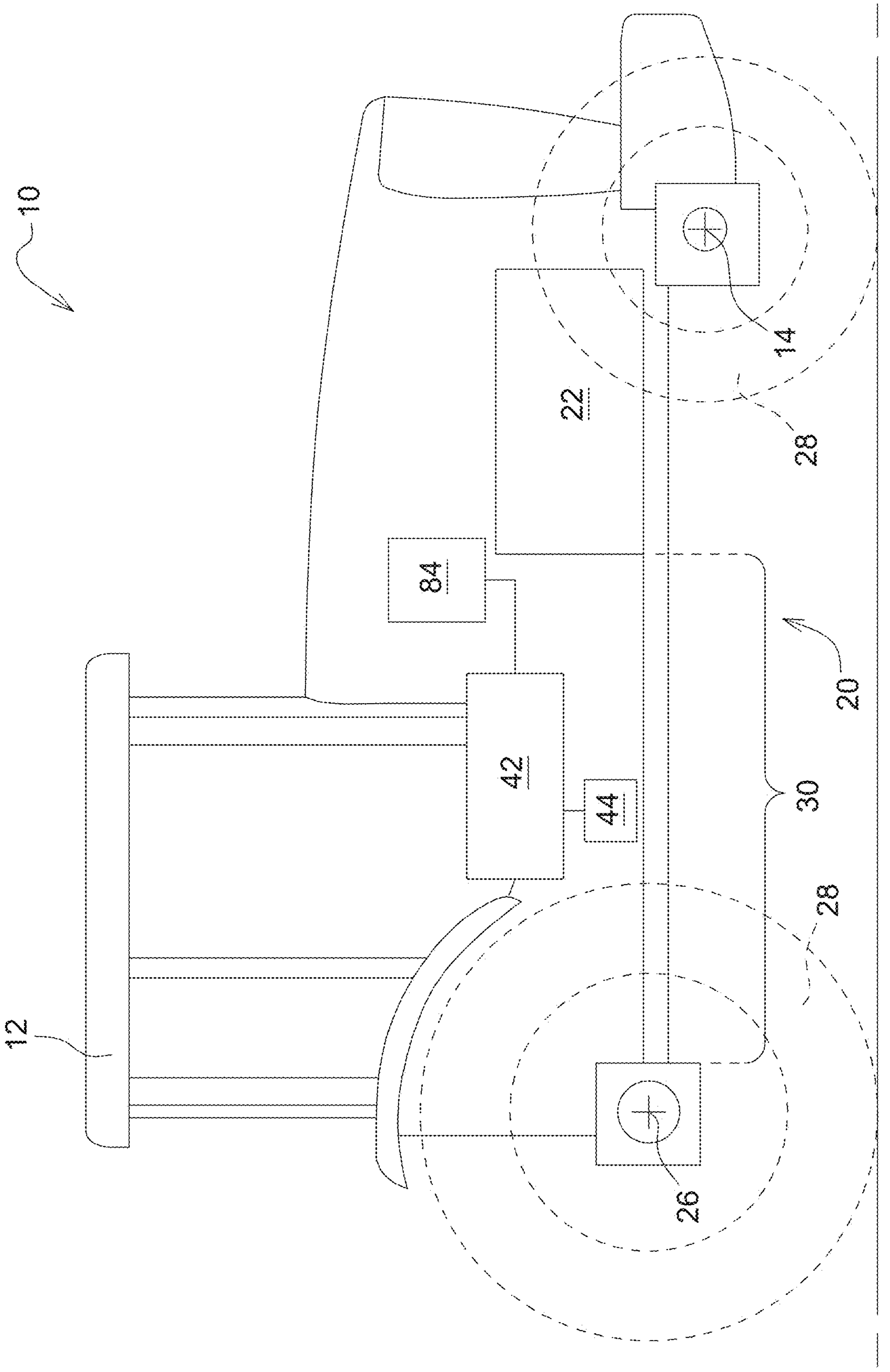
FIG. 1 shows a schematic illustration of a commercial vehicle according to the disclosure.

FIG. 1 shows a schematic illustration of an agricultural commercial vehicle 10 according to the disclosure, for example, a tractor, having a powertrain 20. The commercial vehicle 10 furthermore comprises a cabin 12, a front vehicle axle 14 and a rear vehicle axle 26. The commercial vehicle 10 can have one or a plurality of ground-engaging means in the form of wheels 28. The powertrain 20 comprises a drive motor 22 which can be embodied as an internal combustion engine, and a gearbox structure 30 which can be assembled from different individual gearbox components.

Figure 2:
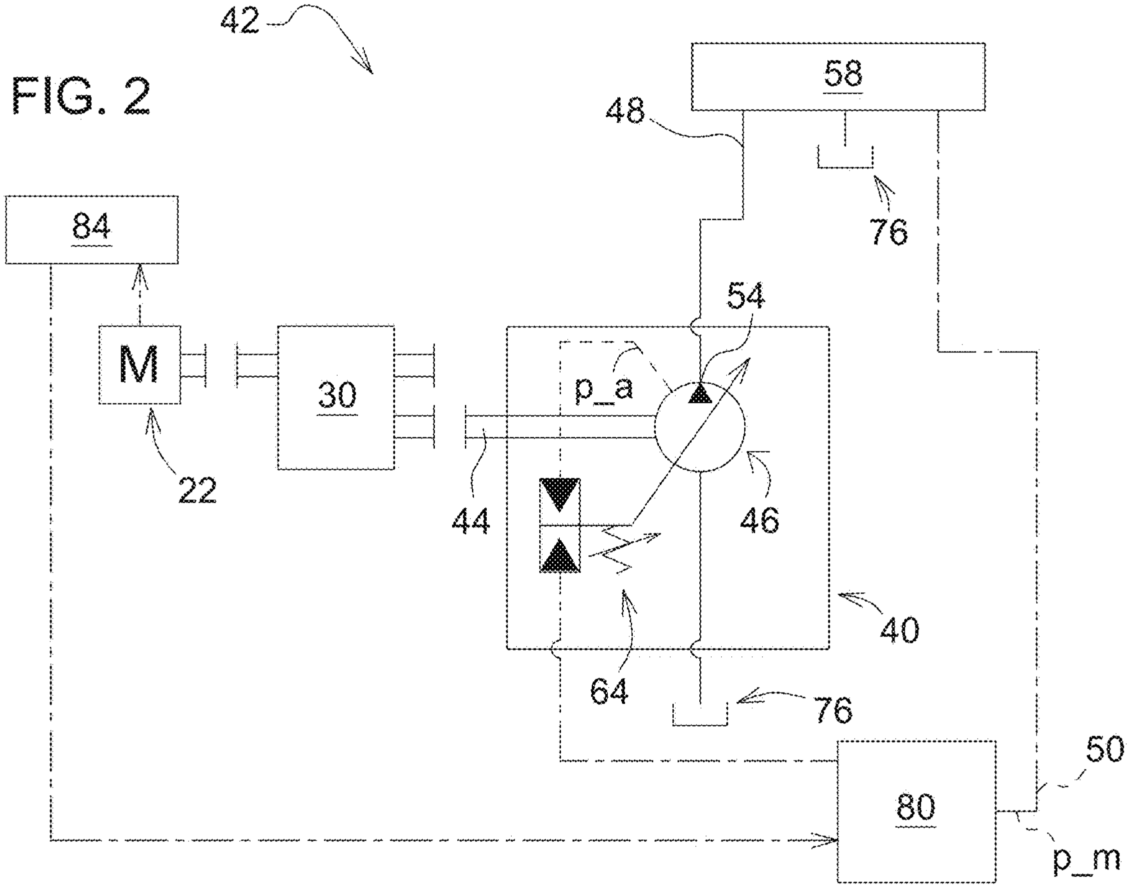
FIG. 2 shows a hydraulic circuit diagram having the hydraulic assembly according to the disclosure in a first embodiment.
Figure 3:
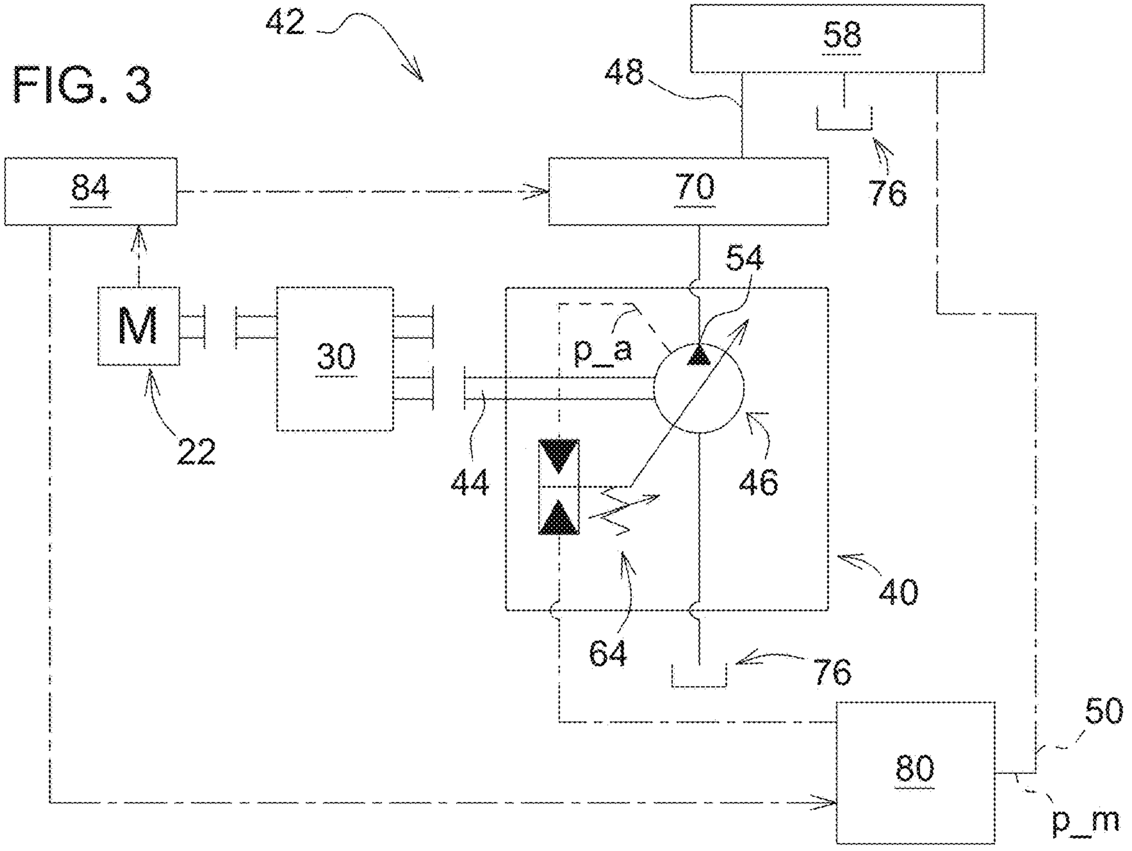
FIG. 3 shows a hydraulic circuit diagram having the hydraulic assembly according to the disclosure in a further embodiment.

The commercial vehicle 10 has a hydraulic assembly 42 having a pump unit 40. As can be seen in FIG. 2 and FIG. 3, the drive motor 22 can drive the gearbox structure 30 which by way of a gearbox component and a pump drive shaft 44 drives a variable pump 46 of the pump unit 40. The hydraulic assembly 42 can be integrated in the commercial vehicle 10 in the manner of a construction kit. An installation of the hydraulic assembly 42 in the commercial vehicle 10 in the manner of a construction kit can be facilitated by various hydraulic interfaces. For example, a supply connector 48, a feedback connector 50 and a tank connector 92 can serve as such interfaces.

According to FIG. 2, a pump outlet 54 of the pump unit 40 is connected to the supply connector 48 so as to supply hydraulic consumers 58 of the commercial vehicle 10. An adjustment control 64 for adjusting a hydraulic discharge flow of the variable pump 6 depends on the outlet pressure $p_a$ of the latter and on a reported pressure $p_m$, or reported load pressure, at the feedback connector 50. On the inlet side, the variable pump 46 is connected to a hydraulic tank 76. The hydraulic medium conveyed to the consumers 58 flows back into a or the hydraulic tank 76. The hydraulic assembly 42 can have one or a plurality of tank connectors 92 which are effective as interface(s) of the assembly 42 for connecting a or the hydraulic tank 76.

In FIG. 2, a valve device 80 is hydraulically interposed in the flow path between the feedback connector 50 and the adjustment control 64.

FIG. 3 shows a further embodiment of the hydraulic assembly 42. In this embodiment, there is the valve device

80 as well as a valve device 70. The latter is hydraulically interposed in the flow path between the pump outlet 54 and the supply connector 48. As a result, the supply connector 48 is able to be hydraulically connected to the pump outlet 54 depending on a state of the valve device 70.

The aforementioned hydraulic interfaces, such as the supply connector 48, the feedback connector 50, the tank connector 92, can preferably be disposed directly on the respective component (e.g., the pump unit 40, the valve device 70, the valve device 80) of the hydraulic assembly 42, or be disposed so as to be spaced apart from the respective component of the hydraulic assembly 42 by means of a line-type extension.

Figure 4A:
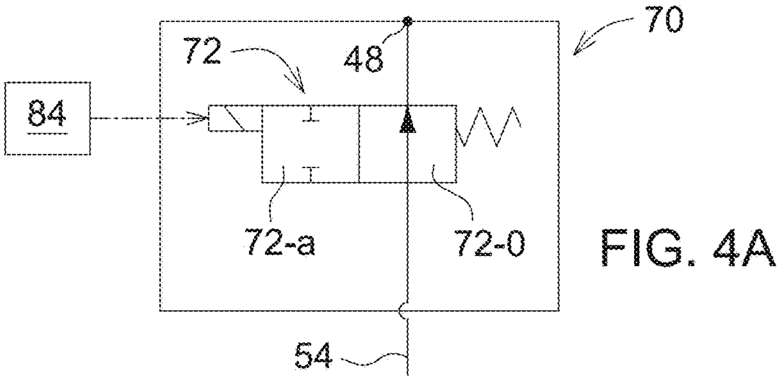
FIG. 4A shows a first exemplary embodiment of a valve device between a variable pump and supply connector within the hydraulic assembly.

In FIG. 4A, the valve device 70 in a first embodiment contains a 2/2-way valve as a valve unit 72. Proceeding from a first shift position or resting position 72-0, a second shift position 72-*a* is activatable by a suitable control unit 84. The resting position 72-0 acts as a hydraulic connection in the flow path between the pump outlet 54 and the supply connector 48, and the second shift position 72-*a* acts as a hydraulic interruption.

Figure 4B:
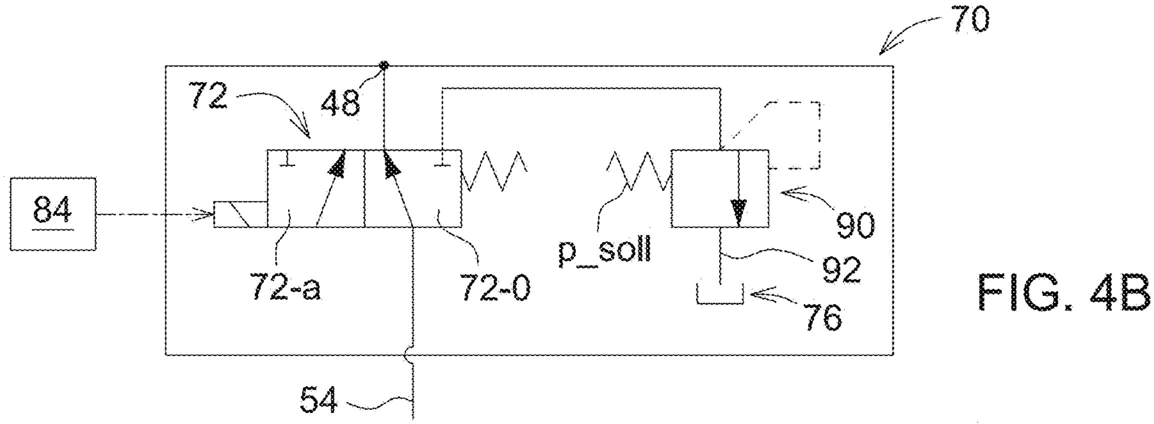
FIG. 4B to FIG. 4F show further exemplary embodiments of the valve device between a variable pump and a supply connector within the hydraulic assembly.

In FIG. 4B, the valve unit 72 of the valve device 70 is designed as a 3/2-way valve, whereby the latter has two valve connectors on the connection side that faces away from the pump outlet 54 in such a manner that, in an activated second shift position 72-*a*, the pump outlet 54 is hydraulically connectable to a tank connector 92 depending on reaching or exceeding a predetermined nominal pressure p_soll as the outlet pressure p_a. For this purpose, a pressure relief valve 90 is used, the restoring spring thereof being sized to the nominal pressure p_soll.

Figure 4C:
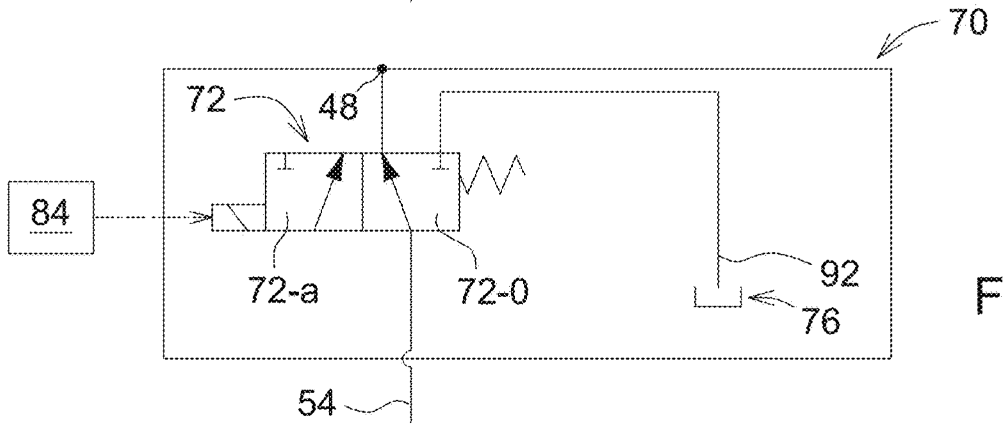

In the valve unit 72 according to FIG. 4C, the pump outlet 54 in the second shift position 72-*a* is permanently hydraulically connected to the tank connector 92.

Figure 4D:
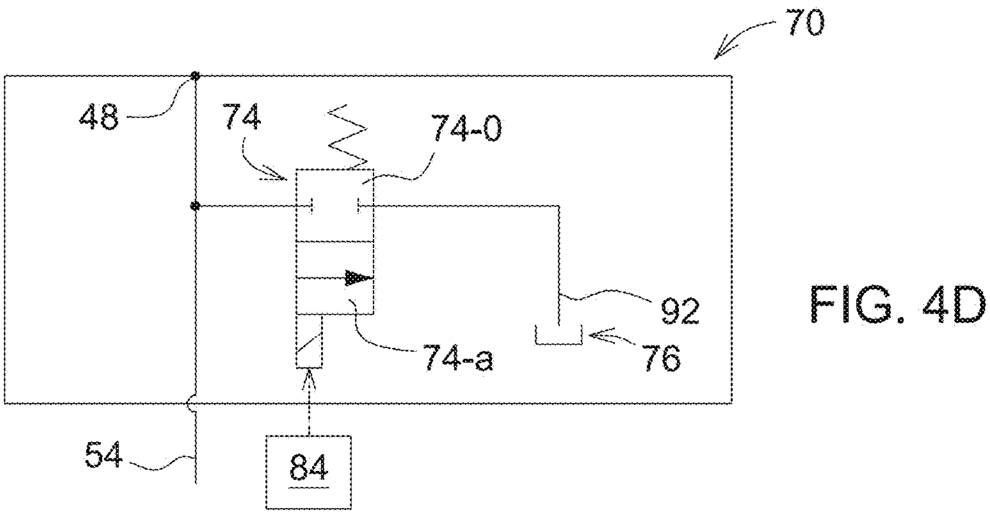

The valve device 70 according to FIG. 4D does not contain any valve unit 72 as a connection and interruption in the flow path between the pump outlet 54 and the supply connector 48. Instead, said valve device 70 contains a valve unit 74, which is hydraulically connected to the aforementioned flow path, as a hydraulic branch to a tank connector 92. The valve unit 74 has two shift positions 74-0, 74-*a* which are activatable by the control unit 84.

Figure 4E:
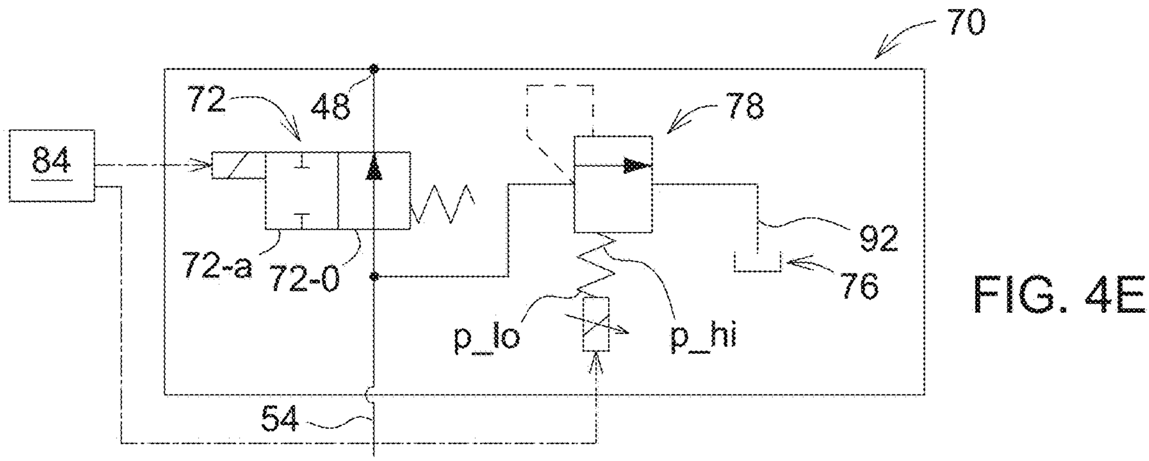

The valve device 70 according to FIG. 4E contains a combination of a valve unit 72 in the flow path between the pump outlet 54 and the supply connector 48, and a valve unit 78, which is hydraulically connected to this flow path, as a hydraulic branch to a tank connector 92. The valve unit 78 has a pressure relief valve having an adjustable restoring spring. The restoring spring is set to a variable nominal pressure by means of the control unit 84, depending on the required operating mode of the hydraulic assembly 42, for example, set to a low value p_lo (e.g., 5 to 10 bar), or to a high value p_hi (e.g., 235 bar). In the first shift position of the valve unit 78 illustrated in FIG. 4E, the latter acts as a hydraulic interruption to the tank connector 92. As soon as the set nominal pressure has been reached or exceeded by the outlet pressure p_a at the pump outlet 54, a second shift position in which the valve unit 78 is effective as a hydraulic connection to the tank connector 92 is established at the valve unit 78.

Figure 4F:
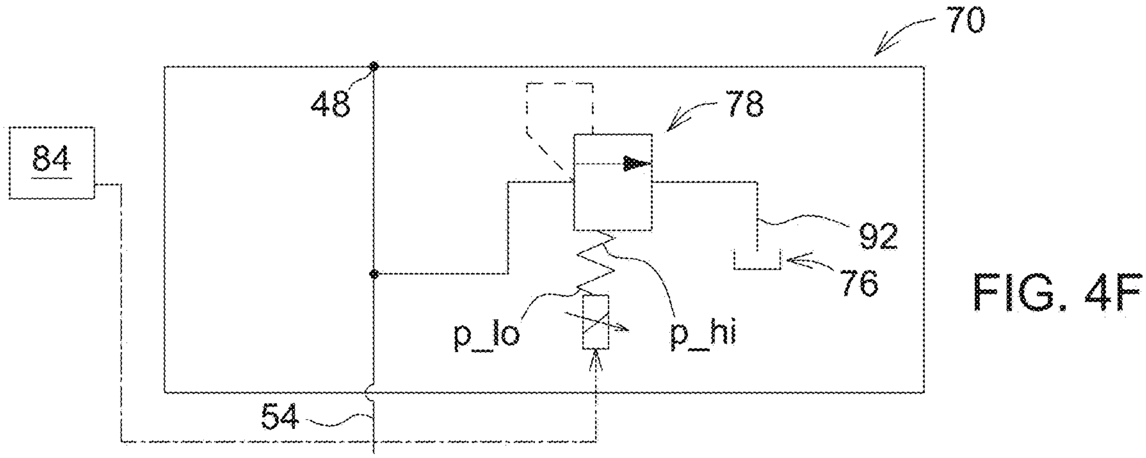

The valve device 70 according to FIG. 4F contains the aforementioned valve unit 78 and no valve unit 72.

Figure 5A:
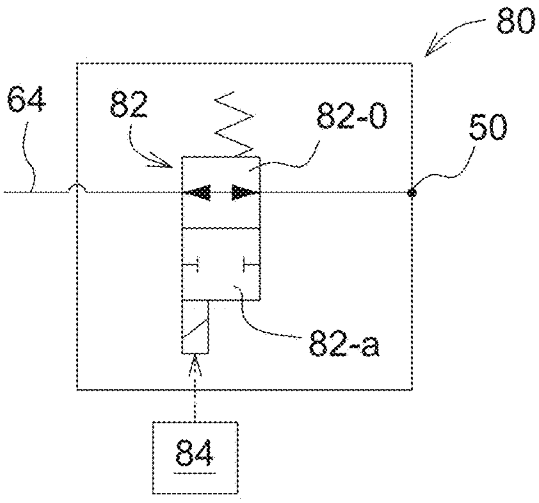
FIG. 5A shows a first exemplary embodiment of a valve device between a feedback connector and an adjustment control of the variable pump within the hydraulic assembly.

FIG. 5A shows the valve device 80 in the flow path between the feedback connector 50 and the adjustment control 64. The valve unit 82, which is designed as a 2/2-way valve and activatable by the control unit 84, herein acts as a hydraulic connection or interruption in the flow path, depending on its shift position 82-0 (first shift position) or 82-*a* (second shift position).

Figure 5B:
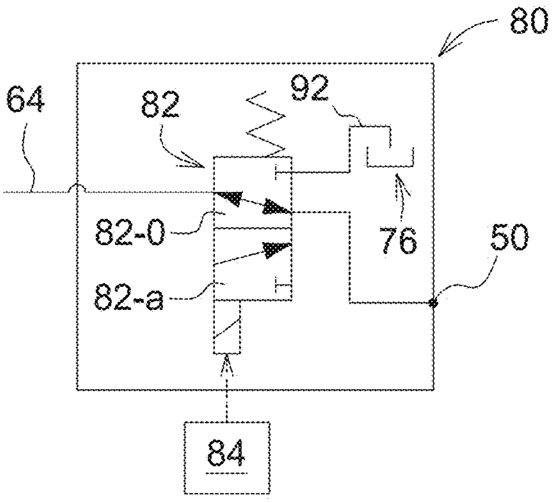
FIG. 5B shows a further exemplary embodiment of the valve device between a feedback connector and an adjustment control of the variable pump within the hydraulic assembly.

The valve unit 82 in FIG. 5B is modified to the extent that said valve unit 82 therein is designed as a 3/2-way valve having two valve connectors on the connection side that faces away from the adjustment control 64. The adjustment control 64 is hydraulically connected to the tank connector 92 in the second shift position 82-*a*.

The start-up phase of the drive motor 22 can be supported with low energy losses by the hydraulic logic described, this meaning technical advantages, for example, during a cold start-up.

Prior to a start-up of the commercial vehicle 10, the adjustment control 64, for example, the adjustment cylinder thereof, is usually set to a conveying position for a maximum discharge flow, due to the pressure conditions. The objective lies in keeping the power input of the variable pump 46 as small as possible in the start-up phase of the commercial vehicle 10, and to hereby also optionally set the adjustment control 64, for example, the adjustment cylinder thereof, to a conveying position for a minimum discharge flow. This objective is achieved by the hydraulic assemblies 42 according to FIG. 2 and FIG. 3.

Proceeding from the resting positions or first shift positions 72-0, 74-0, 82-0 of the valve units 72, 74, 82, and/or from a set high nominal pressure p_hi at the valve unit 78, an envisaged start-up of the drive motor 22 is detected by the control unit 84 (e.g., via received bus signals of a vehicle bus such as, for instance, ISO, CAN), said control unit 84 thereafter activating the second shift position 72-*a*, 74-*a*, 82-*a* and/or setting the low nominal pressure p_lo at the valve unit 78. The drive motor 22 can thereafter be started. After the start-up procedure has been carried out, the control unit 84 can transfer the valve units 72, 74, 82 back to their first shift position 72-0, 74-0, 82-0 and/or alter the set low nominal pressure p_lo at the valve unit 78 again, in that said control unit 84 sets the high nominal pressure p_hi.

During and immediately after the start-up of the drive motor 22, the outlet pressure p_a of the variable pump 46 in the variant according to FIG. 4A increases only up to a standby pressure, while the adjustment control 64 adjusts the conveying position in the direction of a minimum discharge flow.

While the pump adjustment is adjusted in the direction of the minimum conveying position, the outlet pressure p_a could increase further. In order to avoid this undesirable pump output, the nominal pressure p_soll in the variant according to FIG. 4B can be set in such a manner that the latter corresponds to an outlet pressure p_a which is sufficiently high to control the adjustment control 64 in the direction of the minimum conveying position.

In the variant according to FIG. 4C, the adjustment control 64 in the second shift position 72-*a* does indeed remain in its maximum conveying position, but the variable pump 46 only requires a minor drive output because the outlet pressure p_a corresponds approximately to a very low tank pressure.

The aforementioned very low tank pressure at the pump outlet 54 can also be achieved in the variant according to FIG. 4D.

In the variant according to FIG. 4E, the variable pump 46 in the second shift position also requires only a minor drive output, because the outlet pressure p_a corresponds approximately to a very low tank pressure. The minor drive output for the variable pump 46 is facilitated in that the very low nominal pressure p_lo is set at the valve unit 78.

The aforementioned very low tank pressure at the variable pump 46 can also be achieved with the variant according to FIG. 4F.

In the variants according to FIG. 5A and FIG. 5B, no load is sensed in the second shift position 82-*a*, so that the adjustment control 64 can be influenced in the direction of the minimum conveying position. Moreover, it is possible that the outlet pressure p_a of the variable pump 46 increases only up to a standby pressure.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A hydraulic assembly for a commercial vehicle, comprising:

a supply connector, which is hydraulically connected or connectable to a pump outlet of a hydraulic variable pump, as an interface for supplying hydraulic consumers of the commercial vehicle;

a feedback connector as an interface for pressure feedback from consumers;

an adjustment control, which depends on an outlet pressure of the variable pump and on a reported pressure of the feedback connector, for adjusting the variable pump;

a hydraulic valve device in the flow path between the feedback connector and the adjustment control, the valve device including a valve unit having a first shift position which is effective as a hydraulic connection in the flow path and a second shift position which is effective as a hydraulic interruption in the flow path; and a second hydraulic valve device in the flow path between the pump outlet and the supply connector, wherein the second valve device includes at least one of a second valve unit having a first shift position which is effective as a hydraulic connection in the flow path and a second shift position which is effective as a hydraulic interruption in the flow path, and wherein in the second shift position of the second valve unit disposed in the flow path between the pump outlet of the variable pump and the supply connector the pump outlet is hydraulically connectable or hydraulically connected to a tank connector.

2. The hydraulic assembly of claim 1, wherein the valve unit disposed in the flow path between the feedback connector and the adjustment control has a single valve connector at least on the connection side that faces the adjustment control.

3. The hydraulic assembly of claim 1, wherein the valve unit has two valve connectors on the connection side that faces away from the adjustment control such that in the second shift position the adjustment control is hydraulically connected to a tank connector.

4. The hydraulic assembly of claim 1, wherein the second valve device includes a third valve unit hydraulically connected to the flow path as a branch to a tank connector and having a first shift position which is effective as a hydraulic interruption to the tank connector and a second shift position which is effective as a hydraulic connection to the tank connector.

5. The hydraulic assembly of claim 1, wherein the pump outlet is hydraulically connectable to the tank connector depending on reaching or exceeding a predetermined nominal pressure at the pump outlet.

6. The hydraulic assembly of claim 1, wherein the second valve unit disposed in the flow path between the pump outlet of the variable pump and the supply connector has a single valve connector at least on the connection side that faces the pump outlet.

7. The hydraulic assembly of claim 1, wherein the second valve unit disposed in the flow path between the pump outlet of the variable pump and the supply connector has two valve connectors on the connection side that faces away from the pump outlet.

8. A commercial vehicle comprising:

a drive motor;

a hydraulic assembly including:

a supply connector, which is hydraulically connected or connectable to a pump outlet of a hydraulic variable pump, as an interface for supplying hydraulic consumers of the commercial vehicle;

a feedback connector as an interface for pressure feedback from consumers;

an adjustment control, which depends on an outlet pressure of the variable pump and on a reported pressure of the feedback connector, for adjusting the variable pump;

a hydraulic valve device in the flow path between the feedback connector and the adjustment control, the valve device including a valve unit having a first shift position which is effective as a hydraulic connection in the flow path and a second shift position which is effective as a hydraulic interruption in the flow path; and a second hydraulic valve device in the flow path between the pump outlet and the supply connector, wherein the second valve device includes a second valve unit having a first shift position which is effective as a hydraulic connection in the flow path and a second shift position which is effective as a hydraulic interruption in the flow path, and wherein the second valve unit disposed in the flow path between the pump outlet of the variable pump and the supply connector has two valve connectors on the connection side that faces away from the pump outlet.

9. The commercial vehicle of claim 8, wherein the drive motor is operatively connected to the variable pump.

10. The commercial vehicle of claim 8, wherein the valve unit, immediately prior to start-up or during start-up of the drive motor, is in its second shift position.

11. A hydraulic assembly for a commercial vehicle, comprising:

a supply connector, which is hydraulically connected or connectable to a pump outlet of a hydraulic variable pump, as an interface for supplying hydraulic consumers of the commercial vehicle;

a feedback connector as an interface for pressure feedback from consumers;

an adjustment control, which depends on an outlet pressure of the variable pump and on a reported pressure of the feedback connector, for adjusting the variable pump;

a hydraulic valve device in the flow path between the feedback connector and the adjustment control, the valve device including a valve unit having a first shift position which is effective as a hydraulic connection in the flow path and a second shift position which is effective as a hydraulic interruption in the flow path; and a second hydraulic valve device in the flow path between the pump outlet and the supply connector, wherein the second valve device includes a third valve unit hydraulically connected to the flow path as a branch to a tank connector and having a first shift position which is effective as a hydraulic interruption to the tank connector and a second shift position which is effective as a hydraulic connection to the tank connector.

12. The hydraulic assembly of claim 11, wherein the third valve unit branching off from the flow path is designed as a 2/2-way valve.

13. The hydraulic assembly of claim 11, wherein the third valve unit branching off from the flow path assumes its second shift position effective as a hydraulic connection to the tank connector depending on reaching or exceeding a predetermined nominal pressure at the pump outlet.

14. The hydraulic assembly of claim 13, wherein the nominal pressure is variably adjustable at the third valve unit.

15. The commercial vehicle of claim 11, wherein the second valve device includes a second valve unit having a first shift position which is effective as a hydraulic connection in the flow path and a second shift position which is effective as a hydraulic interruption in the flow path.

* * * * *